Figure 1:
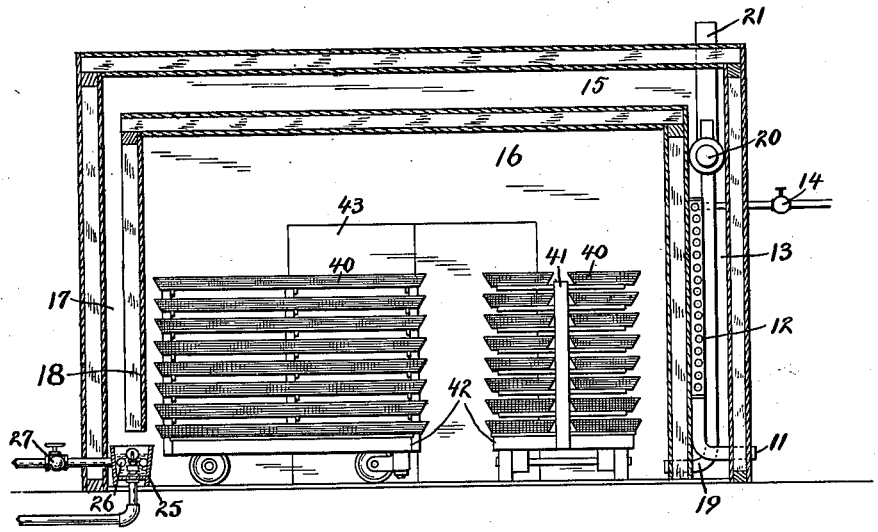

H. HUNTER.
PROCESS OF TREATING RUBBER.
APPLICATION FILED SEPT. 25, 1915.

1,218,261.

Patented Mar. 6, 1917.

WITNESSES:
Frank A. Fahle

INVENTOR
Harry Hunter

BY
Hood & Selby
ATTORNEYS

UNITED STATES PATENT OFFICE.

HARRY HUNTER, OF INDIANAPOLIS, INDIANA, ASSIGNOR TO THE HUNTER DRY KILN CO., OF INDIANAPOLIS, INDIANA, A CORPORATION OF INDIANA.

PROCESS OF TREATING RUBBER.

1,218,261. Specification of Letters Patent. Patented Mar. 6, 1917.

Application filed September 25, 1915. Serial No. 52,577.

*To all whom it may concern:*

Be it known that I, HARRY HUNTER, a citizen of the United States, residing at Indianapolis, in the county of Marion and State of Indiana, have invented a new and useful Process of Treating Rubber, of which the following is a specification.

It is the object of my present invention to improve the process of treating rubber, especially in connection with the removal of moisture from the rubber.

In the treatment of rubber as ordinarily practised, the moisture is removed by hanging the rubber in a dry room which is maintained at a temperature of about 95° F. The temperature in this room is never allowed to exceed 105°, as it has been found that under the conditions in such dry rooms a higher temperature produces a deterioration of the rubber, and causes the formation of a crust on the surface of the rubber. On account of the low temperature which has been necessary, this drying process has usually required from one to three weeks.

I have discovered that if rubber, whether or not it has been previously dried, be exposed to air which is maintained relatively humid, and such air is kept in circulation, preferably with a continuous supply of fresh air, the temperature may be greatly raised beyond the ordinary limit, even as high as 160° to 170° F.; and that by such exposure for several hours many benefits are obtained. In spite of having the air moist, or perhaps because of it, this treatment enables the drying operation, if drying is done at the same time, to be completed within from twelve to forty-eight hours, at the longest, instead of requiring two or three weeks. Moreover, such drying is accomplished without any of the surface crusting which so frequently occurs, even at much lower temperatures, in the ordinary drying of rubber. In addition, and chiefly, the rubber which is treated by my improved process, whether or not such rubber has been previously dried, is of better quality than that which has not been so treated but is merely dried by the process ordinarily used.

I am not certain what the reason is for this improvement in the condition of the rubber. It may be due to a greater uniformity of moisture of the rubber throughout its mass, on account of the lack of surface crusting. It may be due to the decrease in the length of time required for exposing the rubber to the treatment, though I think this is not the reason because of the benefits obtained from applying my process of treatment to rubber which has already been dried in the usual slow manner. It may be due to some chemical change in the rubber itself, such as polymerization, produced by the uniform humidity and higher temperature of the air in the drying room. It may be due to changes in the physical structure of the rubber, from some cause, and I believe that some such physical changes do occur. Whatever the cause may be, the improvement in the rubber treated by my method is most marked.

Figure 2:
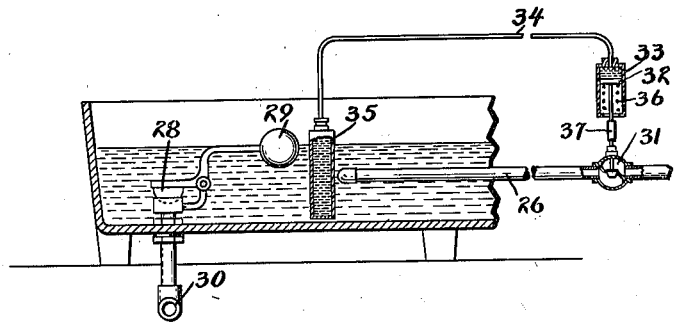

The accompanying drawing illustrates an apparatus for carrying out my improved process. Figure 1 is a cross section through a kiln and humidifier conveniently used in carrying out my improved process, showing two truck loads of rubber in the kiln; and Fig. 2 is a view on a larger scale showing the controlling means for maintaining the constant quantity of water in the humidifier and for controlling the heating means for the water automatically.

The kiln which I have found most effective in carrying out my improved process is such a one as that shown in my prior Patent No. 1,067,921, granted July 22, 1913. In this kiln, air is supplied from the outside pipes 11 which discharge the air upwardly so that it passes around a series of heating pipes 12, located in a side compartment 13 of the kiln and maintaining the air circulation, the supply of steam to the pipes 12 being controlled by any suitable valve 14 for varying the heating of the air; the compartment 13 at its upper end discharges the air into a compartment 15 over the treating chamber 16, said compartment 15 in turn discharging the air to a downwardly leading compartment 17 which communicates beneath a partition 18 with the treating chamber 16. The air after passing through the treating chamber escapes therefrom by way of pipes 19 and a header 20 through a discharge pipe 21 to the atmosphere. In this kiln there is a constant circulation of air from the atmosphere through the kiln and back to the atmosphere.

In order to maintain the air thus passing through the kiln at the desired relative humidity, a water container 25 is placed so that the water in it is exposed to the passing air before it enters the treating chamber, such water being maintained at a substantially constant quantity and temperature, the maintenance of the constant quantity assisting in the maintenance of the constant temperature. The most convenient location for this water container is just below the partition 18, so that the surface of the water in the container is struck by the air as it reaches the end of its downward journey through the passage 17, the container 25 being rather long and narrow in this arrangement. Submerged in the water in the container 25 are steam pipes 26, the supply of steam to which may be manually controlled by a hand valve 27 to control the temperature of the water in the container. The quantity of the water in the container is maintained constant by a float-operated valve 28, the operating float 29 of which is controlled by the water level in the container 25. The valve 28 controls the supply of water to the container from the water supply pipe 30. In addition to the manual control valve 27, the supply line to the steam pipes 26 is provided with an automatically controlled valve 31 (see Fig. 2), which valve is connected to the piston 32 in a cylinder 33 connected by a pipe 34 to a closed vessel 35 immersed in the water in the container 25. The vessel 35, pipe 34, and cylinder 33 contain some suitable fluid, preferably a substantially incompressible one, such as oil. This fluid expands and contracts as the temperature of the water in the container rises and falls, and by such expansion and contraction either forces the piston 32 downward to move the valve 31 toward or to a closed position or to allow the spring 36 to force such piston upward to open such valve, thus diminishing or increasing the supply of steam to the pipes 26, respectively, and maintaining substantially constant the temperature of the water. The float valve 30 maintains the quantity of the water in the container constant, and the automatic valve 31 maintains the temperature of such water constant, the maintenance of temperature being assisted by the maintenance of the constant quantity so that there are no violent fluctuations in temperature on account of sudden influxes of large quantities of cold water. As a result of maintaining this constant temperature and quantity of water, the air which passes under the lower edge of the partition 18 into the treating chamber 16 is humidified to a definite degree. The temperature and humidity of the air thus entering the treating chamber 16 may be controlled by the valve 14 and by the adjustment of the action of the automatic valve 31, by a length-adjusting coupling 37, in the stem of the valve 31.

In operation, as the air passes over the surface of the water in the container 35 a certain amount of evaporation takes place, depending upon the temperature of the water and upon the humidity of the air drawn from the atmosphere, such temperature being regulated to suit existing conditions. This evaporation causes the water in the container 25 to fall slightly, and this in turn causes the float valve 28 to open to admit a small amount more of water to the container to maintain the level of the water substantially constant. By reason of this arrangement, which admits very small quantities of water practically continually to make up for the evaporation, the changes of temperature which would result from the admission of a large quantity of cold water to the container are avoided, and by reason of the maintenance of the constant quantity of water and of the action of the valve 31 the temperature of the water is also maintained substantially constant, so that the evaporation may be what is required to maintain uniform the humidity of the air entering the treating chamber 16. The temperature of the air is controlled by the valve 14. This air temperature may range from 100° to 160 or 170° F., and the relative humidity may range from 20% to 75% or even 80%, the relative humidity being higher for higher temperatures to produce the best results. The best results are produced most quickly with an air temperature of from 140° to 165° F. and a relative humidity of between 30% and 35%. Air temperatures much in excess of 165° are less advantageous because of the difficulty of maintaining the desired relative humidity, though except for this one difficulty good results have been obtained with temperatures up to 175° F.

The rubber to be treated may or may not have been previously dried, for my process produces its beneficial results in either case, and drying is not essential to such process in its broader aspects, though it occurs if the rubber requires it. This rubber is conveniently carried in trays 40 mounted on frames 41 on trucks 42, which are rolled into and out of the kiln through a suitable door 43. The rubber in the trays 40 is exposed to the constantly changing air in the treating chamber 16, which air is maintained at a substantially constant temperature and relative humidity as already stated. This treatment with the relatively moist air and at the higher temperature produces a better quality of rubber, and also, if drying occurs, a quicker and more uniform drying of the rubber, than does the slow drying by drier air at a lower temperature. The moist air prevents the formation of surface crusts on the rubber, and it is probably this lack of surface crusting that enables the uniform drying throughout the whole mass of the rubber to be obtained, and to be obtained quickly. It may also be, though of this I am not positive, that there are some chemical and physical changes in the structure of the rubber, possibly on account of the higher temperature, the greater amount of moisture in the air, or the continuous change of the air. However this may be, the rubber which has been dried by my process involving the use of relatively moist air at a relatively high temperature for a relatively short time, is of better quality than the same grade of rubber dried by the processes in ordinary use, exceeding such ordinary rubber both in elongation and in the tensile strength. Moreover, it is found in practice that rubber which has been treated by my process can be broken down on the mill in considerable less time than rubber which has not been so treated, thereby making it possible for a much larger quantity of rubber to be milled with the same amount of machinery.

My process is used advantageously on all kinds of rubber, from the original latex up to the final commercial forms, whatever its previous treatment may have been or whatever its subsequent treatment is to be. It may be used as well in reclaiming used rubber as in the original preparation of rubber for use, and whether or not the moisture content of the rubber calls for and the process produces a drying action.

I claim as my invention:

1. That improvement in the art of treating rubber, which consists in exposing to air the rubber to be treated, and maintaining such air at a relative humidity of between 20% and 75% and at a temperature higher than 110° F.

2. That improvement in the art of treating rubber, which consists in exposing to a current of air the rubber to be treated, and maintaining such current of air at a relative humidity of between 20% and 75% and at a temperature between 110° F. and 170° F.

3. That improvement in the art of treating rubber, which consists in exposing to air the rubber to be treated, and maintaining such air at a substantially constant relative humidity between 20% and 75% and at a substantially constant temperature greater than 110° F.

4. That improvement in the art of treating rubber, which consists in exposing to a current of air the rubber to be treated, maintaining such current of air at a relative humidity of between 20% and 75% and at a temperature higher than 110° F., and continually supplying fresh air from the atmosphere to such current of air.

5. That improvement in the art of treating rubber, which consists in exposing to a current of air the rubber to be treated, maintaining such current of air at a substantially constant relative humidity between 20% and 75% and at a substantially constant temperature greater than 110° F., and continually supplying fresh air from the atmosphere to such current of air.

In witness whereof, I have hereunto set my hand at Indianapolis, Indiana, this twentieth day of September, A. D. one thousand nine hundred and fifteen.

HARRY HUNTER.